May 10, 1932. W. G. WATKINS 1,858,202
PRESSURE RELIEF VALVE
Filed Sept. 5, 1931

Inventor
W. G. Watkins,
By Prevost & Prevost
Attorneys

Patented May 10, 1932

1,858,202

UNITED STATES PATENT OFFICE

WALTER G. WATKINS, OF KANSAS CITY, MISSOURI, ASSIGNOR TO SKELLY OIL COMPANY, OF EL DORADO, KANSAS

PRESSURE RELIEF VALVE

Application filed September 5, 1931. Serial No. 561,462.

My invention consists in new and useful improvements in pressure relief valves and relates more particularly to that type of relief valve wherein mercury or the like is employed as the controlling medium.

In the operation of liquefied petroleum gas installations, there is required a pressure relief valve on the house piping systems. The function of this valve is to prevent the accumulation of excessive pressure on the house line, in the event that the usual regulator should become inoperative, by venting the gas to the atmosphere outside of the dwelling.

It is generally accepted that mercury is poisonous and there are many instances of injuries resulting from mercury poisoning incurred while handling equipment of this type, as heretofore, should one fail to remove the mercury from the valve before taking down the equipment to which it is attached, either for making repairs in the field or for shipment, there was always a danger of the mercury in the valve being spilled throughout the entire equipment, thus involving considerable hazard as well as the loss of mercury which is quite expensive.

It is the primary object of my invention to overcome the disadvantages and dangers heretofore encountered with this type of apparatus and to this end I have provided a pressure relief valve equipped with a mercury cartridge or receptacle which in addition to its function as a part of the valve, may be employed as a shipping container for the mercury. Furthermore, after the mercury cartridge has been installed in the valve, it is unnecessary to remove the same if the valve or equipment should have to be dismantled for any reason, the structure of my improved relief valve being such as to render the escape or spilling of the mercury from the valve either into the connected equipment or into the atmosphere, impossible. With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views, Fig. 1 is a vertical sectional view taken through the relief valve.

Figure 1:
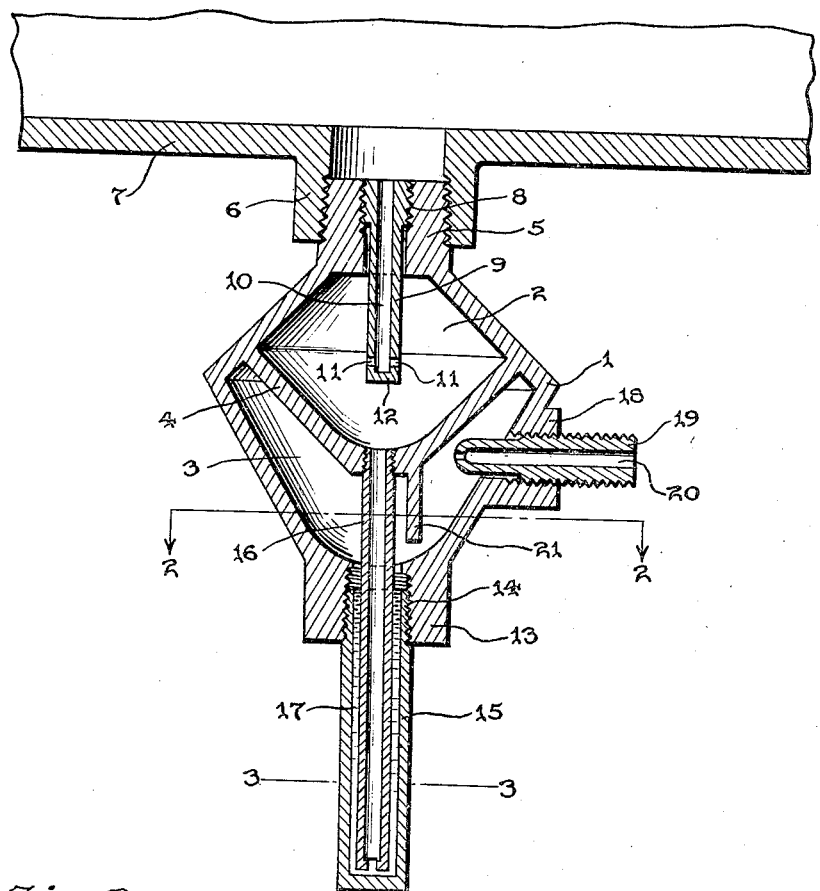
Figure 2:
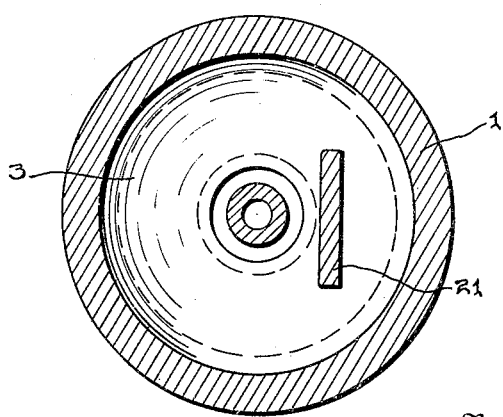
Fig. 2 is a transverse sectional view taken on line 2—2 of Fig. 1.
Figure 3:
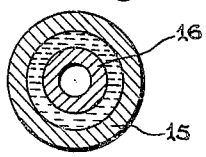
Fig. 3 is a transverse sectional view taken on line 3—3 of Fig. 1.

In the drawings, 1 represents the main body portion or shell of the relief valve, which is divided internally into two superposed chambers 2 and 3, by a substantially conical partition 4. The upper end of the shell 1 terminates in a threaded head 5 which is adapted to be screwed into a suitable boss 6 located in a gas or other pressure line 7. It is to be understood that the illustration of the installation of my improved relief valve is more or less diagrammatic and I in no way intend to limit myself to any particular form of installation, as my invention may be employed in connection with any equipment and at any suitable location where a pressure relief valve is required.

The head 5 is centrally drilled and internally threaded as at 8 to receive an inlet nozzle 9 which extends downwardly for a predetermined distance into the upper chamber 2 of the valve body. This inlet nozzle is provided with a central port 10 which opens at its lower end into two or more transverse ports 11 extending through the wall of the nozzle, the lower extremity of said nozzle being preferably closed as at 12.

The lower end of the shell 1 terminates in a base 13 which is internally threaded as at 14 to receive the threaded upper extremity of a mercury cartridge 15, the latter being preferably in the form of an elongated cylinder hollowed out to form a mercury container, its upper end opening into the lower chamber 3 of the valve body.

16 represents an elongated tube, the upper end of which is screwed into the central portion of the wall 4, said tube extending downwardly through chamber 3 and to a point within and adjacent the lower extremity of the mercury cartridge 15, the lower end of said tube 16 being open and submerged in the column of mercury 17 contained in the cartridge 15.

In one wall of the lower chamber 3 I provide an internally threaded boss 18 which is adapted to receive a threaded transverse outlet nozzle 19, the inner end of which is preferably reduced and extends to a predetermined point within said chamber 3, said nozzle being ported as at 20 whereby any gas entering the chamber 3 is conducted to the atmosphere. Adjacent the inner end of the nozzle 19 and integral with the partition 4 separating the two chambers, I provide a downwardly extending baffle 21 by means of which mercury which may be blown upwardly from the cartridge 15, is prevented from entering the outlet nozzle 19.

The function of my improved mercury relief valve is obvious. Should an excess of pressure occur in the pipe line or other equipment 7, such pressure will be conducted through the inlet nozzle 9 into chamber 2 and thence through tube 16 to the interior of the mercury cartridge 15. If this pressure becomes dangerously high, the mercury in the cartridge 15 is forced upwardly into the chamber 3 as the gas or other pressure medium bubbles through, said pressure medium being vented to atmosphere through the outlet nozzle 19 until the pressure in the line has been reduced to normal. At this time the release of pressure in tube 16 permits the mercury to return into the cartridge 15.

It will thus be seen that I have provided a reliable and efficient pressure relief valve which has no working parts to become worn or out of order and from which it is impossible for the mercury or other liquid to be spilled. Furthermore, in designing this valve I have paid particular attention to simplicity of structure and economy of manufacture.

From the foregoing it is believed that the advantages and operation of my invention may be readily understood by those skilled in the art without further description, it being borne in mind that numerous changes may be made in the details of construction without departing from the spirit of the invention as set forth in the following claims.

What I claim and desire to secure by Letters Patent is:—

1. A pressure relief valve comprising a unitary casting forming a chamber, a partition located in said chamber and forming an upper and a lower compartment therein, a liquid container removably secured to said casting adjacent said lower compartment and in communication therewith, a column of liquid in said container, a tube leading from said upper compartment into said liquid container and having its lower end normally sealed by said liquid, an inlet nozzle extending through a wall of said chamber into said upper compartment, and an outlet nozzle extending through another wall of said chamber into said lower compartment.

2. A pressure relief valve as claimed in claim 1 including a baffle carried by said partition and depending into said lower compartment adjacent the outlet nozzle.

3. A pressure relief valve comprising a body portion forming a chamber, a partition in said chamber forming an inlet and an outlet compartment therein, an elongated tube carried by the lower end of said body portion and closed at its lower extremity, said tube opening at its upper extremity into said outlet compartment, a column of liquid in concentrically within said first named tube and opening into said inlet compartment, the opening into said inlet compartment, the lower end of said second tube being open but normally sealed by said liquid, an inlet nozzle extending through a wall of said body portion into said inlet compartment, and an outlet nozzle extending through another wall of said body portion into said outlet compartment.

In testimony whereof I affix my signature.

WALTER G. WATKINS.

CERTIFICATE OF CORRECTION.

Patent No. 1,858,202.  Granted May 10, 1932, to

WALTER G. WATKINS.

It is hereby certified that error appears in the printed specification of the above numbered patent requiring correction as follows: Page 2, line 79, claim 3, after the word "in" insert the words said tube, a second elongated tube arranged, and same claim, lines 81 and 82, strike out the words and comma "the opening into said inlet compartment,; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.